United States Patent
Kakihara

(10) Patent No.: US 6,472,048 B1
(45) Date of Patent: Oct. 29, 2002

(54) MAGNETIC RECORDING MEDIUM AND PROCESS FOR PRODUCING THE SAME

(75) Inventor: Yasuo Kakihara, Hiroshima (JP)

(73) Assignee: Toda Kogyo Corporation, Hiroshima-ken (JP)

( * ) Notice: Subject to any disclaimer, the term of this patent is extended or adjusted under 35 U.S.C. 154(b) by 0 days.

(21) Appl. No.: 09/675,654

(22) Filed: Sep. 29, 2000

(30) Foreign Application Priority Data

Oct. 1, 1999 (JP) .......................................... 11-281986

(51) Int. Cl.⁷ ................................................. G11B 5/65
(52) U.S. Cl. ................. 428/141; 428/213; 428/964 TS; 428/694 TR; 427/537; 427/539; 427/573; 427/130
(58) Field of Search .............................. 428/694 T, 141, 428/323, 332, 694 TS, 694 TR, 900, 668, 679, 213; 427/537, 539, 599, 573, 576, 130

(56) References Cited

U.S. PATENT DOCUMENTS

| | | |
|---|---|---|
| 5,080,948 A | 1/1992 | Morita et al. |
| 5,094,897 A | 3/1992 | Morita et al. |
| 5,750,230 A | 5/1998 | Ishikawa et al. |
| 6,057,021 A | 5/2000 | Ishikawa et al. |

FOREIGN PATENT DOCUMENTS

| | | | |
|---|---|---|---|
| EP | 0945858 A1 | | 3/1999 |
| EP | 0907162 A1 | * | 4/1999 |
| EP | 0944043 A2 | | 9/1999 |
| EP | 0949608 A1 | | 10/1999 |

* cited by examiner

Primary Examiner—Stevan A. Resan
Assistant Examiner—Kevin M. Bernatz
(74) Attorney, Agent, or Firm—Nixon & Vanderhye P.C.

(57) ABSTRACT

A magnetic recording medium having an excellent surface smoothness comprising a substrate and a maghemite thin film formed on the substrate. The maghemite thin film has a thickness of 10 to 50 nm and a surface roughness represented by an average surface roughness (Ra) of 0.1 to 0.7 nm and a max height (Rmax) of 1 to 10 nm. The magnetic recording medium exhibits an excellent surface smoothness without deterioration in high coercive force.

9 Claims, 1 Drawing Sheet

MAGNETIC RECORDING MEDIUM AND PROCESS FOR PRODUCING THE SAME

BACKGROUND OF THE INVENTION

The present invention relates to a magnetic recording medium and a process for producing the magnetic recording medium, and more particularly, to a magnetic recording medium having an excellent surface smoothness without deterioration in coercive force thereof and a process for producing the magnetic recording medium.

In recent years, in magnetic recording apparatuses such as a hard disc drive, there has been a remarkable tendency that information devices or systems used therefor are miniaturized and required to have a high reliability. With such a recent tendency, in order to deal with a large capacity data, there is an increasing demand for providing magnetic recording media on which information can be stored with a high density.

For satisfying such requirements, the magnetic recording media have been strongly required to not only have a large coercive force, but also reduce a distance between a magnetic head and a magnetic recording layer (magnetic spacing).

As magnetic recording media having a large coercive force, there is widely known those comprising a substrate and a magnetic thin film formed on the substrate.

The magnetic thin films which have been already put into practice, are generally classified into magnetic iron oxide thin films composed of maghemite, etc. (refer to "Technical Report of Electronic Telecommunication Institute", published by Electronic Telecommunication Institute, (1981) MR81-20, pp. 5 to 12, "Ceramics", published by Japan Institute of Ceramics, (1986) Vol. 24, No. 1, pp. 21 to 24, and Japanese Patent Publication (KOKOKU) Nos. 51-4086 (1976) and 5-63925(1993)); and magnetic alloy thin films composed of Co—Cr alloy; or the like.

The magnetic iron oxide thin films composed of maghemite are excellent in oxidation resistance or corrosion resistance due to inherent properties of the oxides. Therefore, the magnetic iron oxide thin films can show an excellent magnetic stability independent of change in passage of time and less change in magnetic properties with passage of time. Further, since oxides exhibit a higher hardness than that of metals, no protective film is required so that the magnetic spacing of magnetic recording media having such a magnetic iron oxide thin film can be reduced as compared to that of magnetic recording media having the magnetic alloy thin film composed of Co—Cr or the like. Therefore, the magnetic iron oxide thin film is optimum for the production of high-density magnetic recording media.

It has been attempted to enhance a coercive force of maghemite thin films by incorporating cobalt thereinto. However, with the increase in cobalt content, the maghemite thin films tend to be deteriorated in magnetic stability independent of change in passage of time due to adverse influences of heat or the like.

Meanwhile, the present inventors have already proposed a maghemite thin film which can exhibits a high coercive force even with a less cobalt content by controlling the specific plane spacing of maghemite crystal (Japanese Patent Application Laid-Open (KOKAI) Nos. 11-110731(1999) and 11-110732(1999)).

On the other hand, the magnetic alloy thin films composed of Co—Cr or the like, have a coercive force as high as not less than about 2,000 Oe. However, these magnetic alloy thin films are readily oxidized in themselves and, therefore, tend to be deteriorated in stability independent of change in passage of time as well as magnetic properties. In order to prevent the deterioration of magnetic properties due to the oxidation, a protective film of diamond-like carbon, $SiO_2$ or the like having a thickness of usually 100 to 200 Å, is formed on the surface of the magnetic alloy thin film, thereby causing the increase in magnetic spacing corresponding to the thickness of the protective film.

In magnetic recording media, in order to reduce the magnetic spacing, it is necessary to reduce the fly-heights of magnetic head and always cause the magnetic head to be flying stably. In conventional hard disc drive devices, magnetic recording media used therefor have been required to have some surface roughness in order to prevent the magnetic head from being absorbed onto the magnetic recording medium surface due to a meniscus force upon landing on the surface thereof. At the present time, due to the improvement in hard disc systems, magnetic recording media have been no longer required to show such a surface roughness for preventing the magnetic head from being absorbed thereonto. Rather, it has been required that magnetic thin films used in these magnetic recording media have a more excellent surface smoothness.

Also, it is known that the non-smooth surface of magnetic recording media causes media noise. In order to eliminate such a media noise, it is necessary to lessen a surface roughness of the magnetic thin film.

At present, in magnetic recording media having a magnetic oxide thin film, the surface property of the magnetic thin film largely depends on that of an underlying substrate due to its extremely small thickness such as not more than 50 nm. Therefore, it has been required not only to use such a substrate having an excellent surface smoothness, but also to develop techniques for further smoothening the surface of magnetic thin film.

Hitherto, as processes of producing maghemite thin films, there are known (1) a process comprising forming a hematite thin film on a substrate, reducing the hematite thin film at a temperature of 230 to 320° C. to transform the hematite thin film into a magnetite thin film, and then oxidizing the magnetite thin film at a temperature of 290 to 330° C.; (2) a process comprising forming a magnetite thin film on a substrate and oxidizing the magnetite thin film at a temperature of not less than 320° C.; or the like.

Also, as techniques for improving the surface smoothness of magnetic recording media having a magnetic iron oxide thin film, there are known a process of enhancing the surface smoothness under optimized heat- treatment conditions (Japanese Patent No. 2,816,472); a process of sputter-etching the surface of a magnetic recording layer composed of a metal thin film using an oxygen gas (Japanese Patent Application Laid-Open (KOKAI) No. 10-50544(1998)); or the like.

Presently, it has been strongly demanded to provide magnetic recording media having a maghemite thin film capable of showing an excellent surface smoothness while maintaining as much as possible a high coercive force thereof. However, such magnetic recording media satisfying these requirements have not been obtained until now.

Namely, in the process described in Japanese Patent No. 2,816,472, the surface roughness of the glass substrate is reduced by polishing or the like, and the oxidation of the magnetite thin film is conducted in an atmospheric air by appropriately selecting conditions therefor, thereby obtaining magnetic recording media having a low maximum height ($R_{max}$) However, since the thickness of the magnetic thin film is 200 nm in Example of Japanese Patent No. 2,816,472, in the case where the thickness of the magnetic thin film is extremely small, e.g., as small as not more than 50 nm, it is hard to say that the surface roughness of magnetic recording media can be sufficiently improved maintaining as much as possible a high coercive force thereof.

Also, the process described in Japanese Patent Application Laid-Open (KOKAI) No. 10-50544(1998) is directed to the technique for improving the surface smoothness of magnetic recording media having an alloy thin film containing cobalt as a main component. However, in this process, it is required to subject the final product to plasma treatment. Meanwhile, if the maghemite thin film used in the present invention is subjected to the similar plasma treatment, the maghemite thin film suffers from local discoloration, thereby failing to obtain the aimed effect.

As a result of the present inventors' earnest studies for solving the above problems, it has been found that in the process for producing a magnetic recording medium wherein a magnetite thin film is formed on a substrate and then the magnetite thin film is oxidized to a maghemite thin film, by subjecting the magnetite thin film before oxidized to plasma treatment using an oxygen gas or an oxygen-containing mixed gas, the surface of the obtained maghemite thin film formed on the substrate exhibits a center line average roughness (=an average roughness)(Ra) of 0.1 to 0.7 nm and a maximum height (=a max height) ($R_{max}$) of 1 to 10 nm. The present invention has been attained based on the finding.

SUMMARY OF THE INVENTION

It is an object of the present invention to provide a magnetic recording medium which can exhibit an excellent surface smoothness without deterioration in high coercive force thereof.

It is another object of the present invention to provide a economically useful process for producing a maghemite thin film capable of enhancing a surface smoothness of a magnetic layer without deterioration in its high coercive force thereof.

In a first aspect of the present invention, there is provided a magnetic recording medium comprising a substrate and a maghemite thin film formed on the substrate, which maghemite thin film has a thickness of 10 to 50 nm and a surface roughness represented by an average roughness (Ra) of 0.1 to 0.7 nm and a max height ($R_{max}$) of 1 to 10 nm.

In a second aspect of the present invention, there is provided a magnetic recording medium comprising a substrate, a nickel oxide thin film formed on the substrate and a maghemite thin film formed on the nickel oxide thin film, which maghemite thin film has a thickness of 10 to 50 nm and a surface roughness represented by an average roughness (Ra) of 0.1 to 0.7 nm and a max height ($R_{max}$) of 1 to 10 nm.

In a third aspect of the present invention, there is provided a process for producing a magnetic recording medium, comprising the steps of forming a magnetite thin film on a substrate; subjecting the magnetite thin film to plasma treatment using an oxygen gas or an oxygen-containing mixed gas; and oxidizing the thus treated magnetite thin film into a maghemite thin film.

DETAILED DESCRIPTION OF THE INVENTION

Figure 1:
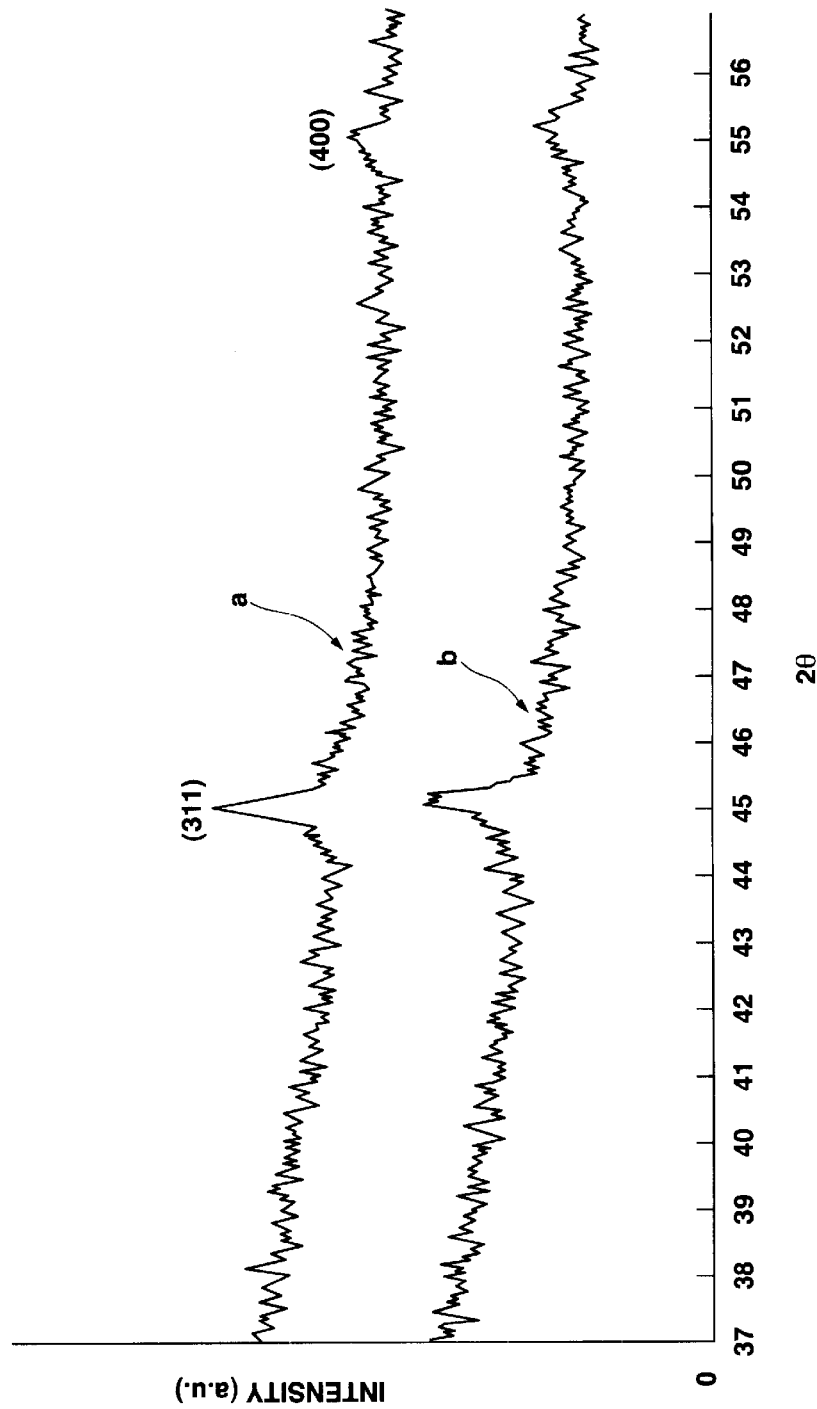
FIG. 1 is a diagram showing X-ray diffraction patterns (a) and (b) of a magnetite thin film before and after plasma treatment, respectively, according to the present invention.

The present invention will be described in detail below.

First, the magnetic recording medium of the present invention is described.

The magnetic recording medium of the present invention comprises:

(I) a substrate and a maghemite thin film formed on the substrate; or (II) a substrate, a nickel oxide thin film formed on the substrate and a maghemite thin film formed on the nickel oxide thin film.

As the substrate used in the present invention, there may be exemplified substrates generally used for this purpose, such as plastic substrates, glass substrates or the like. Among these substrates, the glass substrates are preferred. The surface of the substrate used in the present invention, has the average roughness (Ra) of usually not more than 0.6 nm, preferably 0.1 to 0.5 nm; and the max height ($R_{max}$) of usually not more than 8 nm, preferably 1 to 7 nm.

The maghemite thin film used in the present invention has a thickness of usually 10 to 50 nm, preferably 10 to 30 nm, more preferably 10 to 20 nm. When the thickness of the maghemite thin film is less than 10 nm, it may be difficult to obtain a magnetic recording medium having a coercive force of not less than 2,000 Oe. When the thickness of the maghemite thin film is more than 50 nm, it may become difficult to uniformly magnetize the maghemite thin film up to a deep portion thereof when signals are recorded thereon, thereby failing to achieve good recording and reproducing characteristics.

Maghemite is generally represented by the general formula: $\gamma$-$Fe_2O_3$. However, the maghemite used in present invention may contain a small amount of $Fe^{2+}$.

The maghemite thin film used in the present invention may contain cobalt in a predetermined amount for enhancing a coercive force thereof. The amount of cobalt incorporated in the maghemite thin film is adjusted such that the molar ratio of Co to Fe is in the range of usually not more than 0.2:1, preferably 0.01:1 to 0.1:1. When the content of cobalt is less than 0.01:1, it may tend to be difficult to obtain a magnetic recording medium having a coercive force as high as not less than 2,000 Oe. When the content of cobalt is more than 0.2:1, it may tend to be difficult to obtain a magnetic recording medium having an excellent magnetic stability independent of change in passage of time.

Meanwhile, the maghemite thin film of the present invention may contain, if required, any of elements other than cobalt which are ordinarily used to improve various properties thereof, such as Mn, Ni, Cu, Ti, Zn or the like, at a molar ratio of the element to Fe of usually not more than 0.04:1, preferably 0.005:1 to 0.04:1. In this case, the addition of these elements facilitates the production of magnetic recording media having a high coercive force as well as the incorporation of cobalt.

Among various surface roughness parameters of the maghemite thin film, the average roughness (Ra) thereof is usually 0.1 to 0.7 nm, preferably 0.1 to 0.65 nm, more preferably 0.1 to 0.62 nm. When the average roughness (Ra) is more than 0.7 nm, it is not possible to obtain the aimed effect of the present invention.

Among the surface roughness parameters of the maghemite thin film, the max height ($R_{max}$) thereof is usually 1 to 10 nm, preferably 1 to 9.5 nm. When the max height ($R_{max}$) is more than 10 nm, it may difficult to obtain the aimed effect of the present invention.

The magnetic recording medium of the present invention has a saturation magnetization value (value of magnetization when applying a magnetic field of 20 KOe thereto) of usually 220 to 300 emu/cm$^3$, preferably 230 to 280 emu/cm$^3$, more preferably 230 to 260 emu/cm$^3$; and a coercive force value of usually not less than 1,800 Oe, preferably not less than 1,900 Oe. The upper limit of the coercive force value is preferably 4,000 Oe.

The magnetic recording medium having the maghemite thin film containing cobalt of the present invention has a coercive force value of usually not less than 2,000 Oe, preferably not less than 2,200 Oe, more preferably not less than 3,000 Oe. The upper limit of the coercive force value is preferably 4,000 Oe.

In the magnetic recording medium of the present invention, a nickel oxide thin film as an underlaying film may be disposed between the substrate and the maghemite thin film. When the nickel oxide thin film is formed as an underlaying film for the maghemite thin film, the obtained magnetic recording medium not only can be improved in magnetic properties, especially coercive force, but also have a high coercive force even if the thickness of the maghemite thin film is thinner as compared with the that of the magnetic recording medium having no underlaying film. Further the surface smoothness of the maghemite thin film can be improved by thinning the thickness of the maghemite thin film. The thickness of the nickel oxide thin film is usually 50 to 100 nm.

In the case of the magnetic recording medium having the nickel oxide thin film sandwiched between the substrate and the maghemite thin film, the average roughness (Ra) thereof is usually 0.1 to 0.7 nm, preferably 0.1 to 0.65 nm, more preferably 0.1 to 0.6 nm, still more preferably 0.1 to 0.56 nm. When the average roughness (Ra) is more than 0.7 nm, it may be difficult to obtain the aimed effect of the present invention.

In the case of the magnetic recording medium having the nickel oxide thin film sandwiched between the substrate and the maghemite thin film, the max height ($R_{max}$) thereof is usually 1 to 10 nm, preferably 1 to 9 nm, more preferably 1 to 8 nm, still more preferably 1 to 7.5 nm. When the max height ($R_{max}$) is more than 10 nm, it may be difficult to obtain the aimed effect of the present invention.

The magnetic recording medium having the nickel oxide thin film sandwiched between the substrate and the maghemite thin film, has a saturation magnetization value (value of magnetization when applying a magnetic field of 20 KOe thereto) of usually 220 to 300 emu/cm$^3$, preferably 230 to 280 emu/cm$^3$, more preferably 230 to 260 emu/cm$^3$; and a coercive force value of usually not less than 2,000 Oe, preferably not less than 2,200 Oe, more preferably not less than 2,800 Oe. The upper limit of the coercive force value is preferably 8,000 Oe.

The magnetic recording medium having the nickel oxide thin film sandwiched between the substrate and the maghemite thin film containing cobalt, has a coercive force value of usually not less than 2,200 oe, preferably not less than 2,500 Oe, more preferably not less than 3,200 Oe. The upper limit of the coercive force value is preferably 8,000 Oe.

Next, the process for producing the magnetic recording medium according to the present invention is described.

The magnetic recording medium of the present invention can be produced by subjecting a magnetite thin film formed on a substrate to plasma treatment using an oxygen gas or an oxygen-containing mixed gas, and then oxidizing the magnetite thin film at a temperature of 200 to 450° C. to transform the magnetite thin film into a maghemite thin film.

The magnetite thin film can be formed on the substrate by an ordinary method. For example, the magnetite thin film may be formed on the substrate by a so-called sputtering method, i.e., by producing and depositing magnetite using an Fe alloy target in the presence of an introduced mixed gas of oxygen and noble gas, while appropriately controlling the oxygen flow rate (CCM) in the mixed gas and the magnetite deposition rate (nm/min.).

The oxygen flow rate (CCM) in the mixed gas relative to the magnetite deposition rate (nm/min.) may vary depending upon various conditions for obtaining the magnetite thin film by oxidizing the Fe alloy target, for example, kind and structure of apparatus used, total gas pressure, substrate temperature, area of sputtering target or the like.

The magnetite thin film prior to being subjected to the plasma treatment, has a thickness of usually 10 to 50 nm, and a surface roughness represented by the average roughness (Ra) of usually 0.1 to 0.7 nm and the max height ($R_{max}$) of usually 1 to 10 nm.

The plasma treatment of the magnetite thin film according to the present invention may be conducted at a substrate temperature of usually 100 to 220° C., preferably 150 to 220° C.. When the substrate temperature is out of the above specified range, a sufficient effect may not be obtained.

The plasma treatment of the magnetite thin film may be conducted in an atmosphere containing an oxygen gas or an oxygen-containing mixed gas.

As the oxygen-containing mixed gas, there may be preferably used a mixed gas composed of an oxygen gas and a noble gas. Examples of the noble gases may include helium, neon, argon, krypton, xenon, radon or the like. Among these noble gases, argon is preferred in the consideration of economy, the mixing ratio of the oxygen gas to the noble gas in the mixed gas is usually 100:0 to 50:50.

The plasma-treating time in the present invention is usually 30 seconds to 30 minutes, preferably 1.5 to 30 minutes. When the plasma-treating time is out of the above specified range, a sufficient effect may not be obtained.

The magnetite thin film after the plasma treatment, has a thickness of usually 10 to 50 nm, and a surface roughness represented by the average roughness (Ra) of usually 0.1 to 0.7 nm and the max height ($R_{max}$) of 1 to 10 nm.

In the case where the nickel oxide thin film is used as the underlaying film, the nickel oxide thin film is preliminarily formed on the substrate, and then the magnetite thin film is formed thereon by the same method as described above.

The most important point of the present invention lies in the fact that by subjecting the magnetite thin film before the oxidation treatment, to plasma treatment in an atmosphere containing an oxygen gas or an oxygen-containing mixed gas, the obtained maghemite thin film as a final product can be improved in surface smoothness.

The reason why the surface smoothness of the maghemite thin film can be enhanced, is considered as follows, though not exactly known. That is, by subjecting the magnetite thin film before the oxidation treatment, to plasma treatment in an atmosphere containing an oxygen gas or an oxygen-containing mixed gas, the oxidation of an insufficiently oxidized portion in the magnetite thin film can be promoted, thereby obtaining a more homogeneous magnetite thin film. Then, when such a uniformly oxidized magnetite thin film is subjected to an oxidation treatment, the thin film can be more uniformly oxidized and, as a result, transformed into a maghemite thin film having an excellent surface smoothness.

Meanwhile, in the case where the magnetite thin film is directly oxidized without conducting the plasma treatment, since the magnetite thin film to be subjected to the oxidation treatment, still contains an insufficiently oxidized portion therein, it is not possible to obtain a maghemite thin film having a sufficient surface smoothness. That is, the obtained maghemite thin film has the average roughness (Ra) of more than 0.7 nm and the max height ($R_{max}$) of more than 10 nm.

As shown in FIG. 1, from the comparison between X-ray diffraction patterns of the magnetite thin film before and after the plasma treatment, it is recognized that the plane (311) of the magnetite after the plasma treatment ("b" in FIG. 1) has been shifted to a high angle side as compared to that of the magnetite prior to the plasma treatment ("a" in FIG. 1). This indicates that the spacing of the plane (311) of the magnetite has been narrowed by the plasma treatment, thereby causing a structural change thereof. In general, it is known that when magnetite is transformed into maghemite having a higher degree of oxidation, the plane (311) is narrowed.

Thus, the above fact also shows that the oxidation of the magnetite thin film can be promoted by the plasma treatment.

The magnetic recording medium of the present invention can exhibit an excellent surface smoothness without deterioration in high coercive force thereof and, therefore, is suitable as those for high-density recording.

EXAMPLES

The present invention is described in more detail by Examples and Comparative Examples, but the Examples are only illustrative and, therefore, not intended to limit the scope of the present invention.

Various properties were measured by the following methods.

(1) The surface roughness (average roughness (Ra) and max height (R.ax)) of the magnetite thin film or maghemite thin film is measured using an atomic force microscope (manufactured by Digital Instruments (D.I.)), and evaluated with respect to a 5 µm-square area of each film.

(2) The thickness of a magnetic recording layer of the magnetite thin film or maghemite thin film is determined as follows. That is, before the formation of the thin film, a line is drawn on a substrate using a felt pen. Then, after the formation of the thin film on the substrate, a part of the formed film and the underlying drawn line are simultaneously removed using an organic solvent. The thus formed stepped portion is measured by a tracer-type surface roughness tester (manufactured by DEKTAK). The thickness of the thin film is calculated from the measured value.

(3) The oxidation of the magnetite thin film into the maghemite thin film is confirmed by the change in surface resistivity of the thin film as an index of the oxidation thereof.

That is, the surface resistivity of the magnetite thin film is in the range of 0.001 to 0.5 MΩ, whereas the surface resistivity of the maghemite thin film is raised from 1 to 100 MΩ and varied over the range. The surface resistivity is measured by an Insulation Tester DM-1527 (manufactured by Sanwa Denki Keiki Co., Ltd.) by setting the distance between two probes to 10 mm.

(4) The magnetic properties such as coercive force and saturation magnetization of the magnetic recording medium, are expressed by the values measured using "Vibrating Sample Magnetometer VSM" (manufactured by TOEI KOGYO CO., LTD.) by applying a magnetic field of 20 KOe in maximum thereto.

(5) The X-ray diffraction patterns of the respective thin films are expressed by values measured by "X-Ray Diffractometer RAD-IIA" (manufactured by RIGAKU DENKI CO., LTD.).

The measuring conditions of the X-ray diffraction patterns are as follow:

Lamp used: Fe; lamp voltage: 40 kV; lamp current: 25 mA; sampling width of goniometer: 0.010°; scanning speed: 1.000°/min.; light-emitting (divergent) slit: 1°; scattering slit: 1°; light-receiving slit: 0.30 mm.

The region covering a diffraction angle (2θ) of 30.00° to 60.00° is measured under the above-mentioned conditions.

Example 1

<Production of Magnetic Recording Medium>

The process for producing a magnetic recording medium by directly forming a magnetite thin film on a substrate is described below.

Using an RF sputtering apparatus (High Rate Sputtering Apparatus "SH-250H-T06" manufactured by NIHON SHINKU CO., LTD.), a magnetite thin film containing cobalt was formed on a crystallized glass substrate having the average roughness (Ra) of 0.20 nm and the max height ($R_{max}$) of 5.00 nm, by a reactive sputtering method (substrate temperature: 220° C.; gas pressure: 9 mTorr) using an Fe alloy target containing cobalt (Co content: 4% by weight). The thus obtained magnetite thin film containing cobalt had the thickness of 48 nm, the average roughness (Ra) of 0.57 nm and the max height ($R_{max}$) of 8.00 nm.

Next, an oxygen gas was introduced into the RF sputtering apparatus to produce a plasma in an etching mode. The thus produced plasma was irradiated on the magnetite thin film for 30 minutes (substrate temperature: 180° C.; gas pressure: 9 mTorr; making power: 100 W).

After the plasma treatment, the magnetite thin film containing cobalt showed the average roughness (Ra) of 0.62 nm and the max height ($R_{max}$) of 8.12 nm.

Successively, the magnetite thin film containing cobalt was oxidized at 320° C. for 60 minutes in an atmospheric air, thereby obtaining a maghemite thin film containing cobalt (Co:Fe (mole ratio)=0.04:1).

The thus obtained maghemite thin film containing cobalt had the thickness of 48 nm, a surface roughness represented by the average roughness (Ra) of 0.64 nm, the max height ($R_{max}$) of 8.72 nm, the saturation magnetization value of 244 emu/cm$^3$, and the coercive force of 3,080 Oe.

For your reference, the maghemite thin film containing cobalt produced without the plasma treatment showed a surface roughness represented by the average roughness (Ra) of 0.88 nm and the max height ($R_{max}$) of 14.7 nm, the saturation magnetization value of 255 emu/cm$^3$ and the coercive force of 3,001 Oe.

As seen from the above, it was confirmed that by subjecting the magnetite thin film prior to the oxidation to the plasma treatment, the surface smoothness of the obtained maghemite thin film could be enhanced maintaining as much as possible a high coercive force.

Examples 2 to 6 and Comparative Examples 1 to 3

The same procedure as defined in Example 1 was conducted except that a kind of the target and the plasma treatment conditions for the magnetite thin film were changed variously, thereby obtaining a maghemite thin film.

The production conditions are shown in Table 1 and various properties of the obtained maghemite thin film are shown in Table 2.

Examples 7 to 14 and Comparative Examples 4 to 6

The same procedure as defined in Example 1 was conducted except that a nickel oxide thin film having a thickness of 100 nm was first formed on the glass substrate and then the magnetite thin film was formed thereon, and the plasma treatment conditions for the magnetite thin film were changed variously, thereby obtaining a maghemite thin film.

The production conditions are shown in Table 3 and various properties of the obtained maghemite thin film are shown in Table 4.

As seen from the above, in the case of the magnetic recording medium having the nickel oxide thin film sandwiched between the substrate and the maghemite thin film, the magnetic recording medium can exhibited a more excellent surface smoothness as compared with the those of the magnetic recording medium having no underlaying film.

TABLE 1

Formation of magnetite thin film

Magnetite thin film

| Examples and Comparative Examples | Production conditions Kind of target | Content of cobalt (Co:Fe mole ratio) | Thickness (nm) |
|---|---|---|---|
| Example 2 | 4 wt % Co—Fe | 0.04:1 | 48 |
| Example 3 | 4 wt % Co—Fe | 0.04:1 | 48 |
| Example 4 | 4 wt % Co—Fe | 0.04:1 | 48 |
| Example 5 | 4 wt % Co—Fe | 0.04:1 | 48 |
| Example 6 | Fe | 0:1 | 48 |
| Comparative Example 1 | 4 wt % Co—Fe | 0.04:1 | 48 |
| Comparative Example 2 | 4 wt % Co—Fe | 0.04:1 | 48 |
| Comparative Example 3 | 4 wt % Co—Fe | 0.04:1 | 48 |

Production conditions Plasma treatment

| Examples and Comparative Examples | Ar/$O_2$ (CCM) (Pressure: 9 mTorr) | Treating substrate temperature (° C.) | Treating time (minutes) | Making power (W) |
|---|---|---|---|---|
| Example 2 | 0/10 | 180 | 30 | 100 |
| Example 3 | 0/10 | 180 | 5 | 100 |
| Example 4 | 0/10 | 180 | 10 | 100 |
| Example 5 | 0/10 | 150 | 30 | 100 |
| Example 6 | 0/10 | 180 | 30 | 100 |
| Comparative Example 1 | — | — | — | — |
| Comparative Example 2 | 0/10 | 80 | 30 | 100 |
| Comparative Example 3 | 0/10 | Room temp. | 30 | 100 |

Production conditions Oxidation treatment in air

| Examples and Comparative Examples | Temperature (° C.) | Time (min.) |
|---|---|---|
| Example 2 | 320 | 60 |
| Example 3 | 320 | 60 |
| Example 4 | 320 | 60 |
| Example 5 | 320 | 60 |
| Example 6 | 320 | 60 |
| Comparative Example 1 | 320 | 60 |
| Comparative Example 2 | 320 | 60 |
| Comparative Example 3 | 320 | 60 |

TABLE 2

Various properties of maghemite thin film

| Examples and Comparative Examples | Cobalt content (Co:Fe mole ratio) | Thickness (nm) | Surface roughness $R_a$ (nm) | $R_{max}$ (nm) |
|---|---|---|---|---|
| Example 2 | 0.04:1 | 48 | 0.592 | 9.262 |
| Example 3 | 0.04:1 | 48 | 0.581 | 9.366 |
| Example 4 | 0.04:1 | 48 | 0.571 | 8.837 |
| Example 5 | 0.04:1 | 48 | 0.616 | 8.852 |
| Example 6 | 0:1 | 48 | 0.566 | 8.854 |
| Comparative Example 1 | 0.04:1 | 48 | 0.988 | 12.459 |
| Comparative Example 2 | 0.04:1 | 48 | 0.811 | 9.865 |
| Comparative Example 3 | 0.04:1 | 48 | 0.809 | 13.340 |

Various properties of maghemite thin film Magnetic properties

| Examples and Comparative Examples | Coercive force (Oe) | Saturation magnetization value (emu/$cm^3$) |
|---|---|---|
| Example 2 | 3122 | 242 |
| Example 3 | 3221 | 250 |
| Example 4 | 3355 | 248 |
| Example 5 | 3331 | 248 |
| Example 6 | 1900 | 235 |
| Comparative Example 1 | 2750 | 253 |
| Comparative Example 2 | 3226 | 255 |
| Comparative Example 3 | 3005 | 252 |

TABLE 3

Formation of magnetite thin film Production conditions

| Examples and Comparative Examples | Thickness of nickel oxide thin film as underlaying film (nm) | Kind of target |
|---|---|---|
| Example 7 | 100 | 8 wt % Co—Fe |
| Example 8 | 100 | 8 wt % Co—Fe |
| Example 9 | 100 | 8 wt % Co—Fe |
| Example 10 | 100 | 8 wt % Co—Fe |
| Example 11 | 100 | 8 wt % Co—Fe |
| Example 12 | 100 | 8 wt % Co—Fe |
| Example 13 | 100 | 8 wt % Co—Fe |
| Example 14 | 100 | Fe |
| Comparative Example 4 | 100 | 8 wt % Co—Fe |
| Comparative Example 5 | 100 | 8 wt % Co—Fe |
| Comparative Example 6 | 100 | 8 wt % Co—Fe |

Production conditions

Magnetite thin film    Plasma treatment

Content of    Treating

TABLE 3-continued

| Examples and Comparative Examples | cobalt (Co:Fe mole ratio) | Thickness (nm) | Ar/O₂ (CCM) (Pressure: 9 mTorr) | substrate temperature (° C.) |
|---|---|---|---|---|
| Example 7 | 0.08:1 | 20 | 0/10 | 220 |
| Example 8 | 0.08:1 | 20 | 0/10 | 180 |
| Example 9 | 0.08:1 | 20 | 0/10 | 180 |
| Example 10 | 0.08:1 | 20 | 0/10 | 180 |
| Example 11 | 0.08:1 | 20 | 2/8 | 180 |
| Example 12 | 0.08:1 | 20 | 5/5 | 180 |
| Example 13 | 0.08:1 | 20 | 0/10 | 150 |
| Example 14 | 0:1 | 20 | 0/10 | 180 |
| Comparative Example 4 | 0.08:1 | 20 | — | — |
| Comparative Example 5 | 0.08:1 | 20 | 0/10 | 80 |
| Comparative Example 6 | 0.08:1 | 20 | 0/10 | 300 |

| | Production conditions | | | |
|---|---|---|---|---|
| | Plasma treatment | | Oxidation treatment | |
| Examples and | Treating | Making | In air | |
| Comparative Examples | time (minutes) | power (W) | Temperature (° C.) | Time (min.) |
| Example 7 | 3 | 100 | 320 | 60 |
| Example 8 | 3 | 100 | 320 | 60 |
| Example 9 | 3 | 100 | 320 | 60 |
| Example 10 | 1.5 | 100 | 320 | 60 |
| Example 11 | 3 | 100 | 320 | 60 |
| Example 12 | 1.5 | 100 | 320 | 60 |
| Example 13 | 3 | 100 | 320 | 60 |
| Example 14 | 3 | 100 | 320 | 60 |
| Comparative Example 4 | — | — | 320 | 60 |
| Comparative Example 5 | 3 | 100 | 320 | 60 |
| Comparative Example 6 | 3 | 100 | 320 | 60 |

TABLE 4

| | Various properties of maghemite thin film | | | |
|---|---|---|---|---|
| Examples and | Cobalt content | | Surface roughness | |
| Comparative Examples | (Co:Fe mole ratio) | Thickness (nm) | $R_a$ (nm) | $R_{max}$ (nm) |
| Example 7 | 0.08:1 | 20 | 0.469 | 6.220 |
| Example 8 | 0.08:1 | 20 | 0.455 | 6.764 |
| Example 9 | 0.08:1 | 20 | 0.479 | 6.422 |
| Example 10 | 0.08:1 | 20 | 0.555 | 8.882 |
| Example 11 | 0.08:1 | 20 | 0.544 | 8.371 |
| Example 12 | 0.08:1 | 20 | 0.548 | 8.905 |
| Example 13 | 0.08:1 | 20 | 0.475 | 6.443 |
| Example 14 | 0:1 | 20 | 0.554 | 7.323 |
| Comparative Example 4 | 0.08:1 | 20 | 0.889 | 11.231 |
| Comparative Example 5 | 0.08:1 | 20 | 0.855 | 10.475 |
| Comparative Example 6 | 0.08:1 | 20 | 0.833 | 11.244 |

| | Various properties of maghemite thin film Magnetic properties | |
|---|---|---|
| Examples and Comparative Examples | Coercive force (Oe) | Saturation magnetization value (emu/cm³) |
| Example 7 | 4300 | 236 |
| Example 8 | 3622 | 233 |
| Example 9 | 4785 | 235 |
| Example 10 | 4333 | 244 |
| Example 11 | 3662 | 242 |
| Example 12 | 4432 | 233 |
| Example 13 | 4450 | 234 |
| Example 14 | 2650 | 237 |
| Comparative Example 4 | 4652 | 245 |
| Comparative Example 5 | 3520 | 244 |
| Comparative Example 6 | 2090 | 223 |

What is claimed is:

1. A magnetic recording medium comprising:
a substrate; and
a maghemite thin film formed on said substrate,
said maghemite thin film having a thickness of 10 to 50 nm, and a surface roughness represented by a center line average roughness (Ra) of 0.1 to 0.7 nm and a maximum height ($R_{max}$) of 1 to 10 nm wherein said magnetic recording medium is produced by a process comprising:
(a) forming a magnetite thin film on a substrate;
(b) subjecting said magnetite thin film to plasma treatment at a substrate temperature of 100 to 200° C. using an oxygen gas or an oxygen-containing mixed gas; and
(c) oxidizing said magnetite thin film to transform the magnetite thin film into a Maghemite thin film.

2. A magnetic recording medium according to claim 1, wherein said maghemite thin film contains cobalt at a molar ratio of Co to Fe of not more than 0.2:1.

3. A magnetic recording medium according to claim 1, which further has a saturation magnetization value (value of magnetization when applying a magnetic field of 20 KOe thereto) of 220 to 300 emu/cm³ and a coercive force value of not less than 1,800 Oe.

4. A magnetic recording medium according to claim 1, wherein a nickel oxide thin film is formed between said substrate and said maghemite thin film.

5. A magnetic recording medium according to claim 4, wherein said maghemite thin film has a surface roughness represented by a center line average roughness (Ra) of 0.1 to 0.65 nm and a maximum height ($R_{max}$) of 4 to 9.5 nm.

6. A magnetic recording medium according to claim 4, wherein said nickel oxide thin film has a thickness of 50 to 100 nm.

7. A process for producing a magnetic recording medium, comprising:
forming a magnetite thin film on a substrate;
subjecting said magnetite thin film to plasma treatment at a substrate temperature of 100 to 200° C. using an oxygen gas or an oxygen-containing mixed gas; and
oxidizing said magnetite thin film to transform the magnetite thin film into a maghemite thin film.
wherein said maghemite thin film has a thickness of 10 to 50 nm, and a surface roughness represented by a center line average roughness (Ra) of 0.1 to 0.7 nm and a maximum height ($R_{max}$) of 1 to 10 nm.

8. A process according to claim 7, wherein said plasma treatment of the magnetite thin film is conducted for 30 seconds to 30 minutes.

9. A process according to claim 7, wherein a nickel oxide thin film is formed on said substrate, and then said magnetite thin film is formed on the nickel oxide thin film.

* * * * *